US006895577B1

(12) United States Patent
Noble et al.

(10) Patent No.: US 6,895,577 B1
(45) Date of Patent: May 17, 2005

(54) RISK METRIC FOR TESTING SOFTWARE

(75) Inventors: William Noble, South Lyon, MI (US); Troy Roberts, Grosse Pointe, MI (US)

(73) Assignee: Compuware Corporation, Detroit, MI (US)

( * ) Notice: Subject to any disclaimer, the term of this patent is extended or adjusted under 35 U.S.C. 154(b) by 0 days.

(21) Appl. No.: 09/514,225

(22) Filed: Feb. 28, 2000

Related U.S. Application Data
(60) Provisional application No. 60/134,177, filed on May 13, 1999.

(51) Int. Cl.[7] .............................. G06F 9/44; G06F 11/00
(52) U.S. Cl. .......................... 717/126; 717/125; 714/38
(58) Field of Search .................................. 717/126, 124, 717/129, 132, 133, 155; 714/37, 38; 345/771, 970; 700/29, 97, 100; 702/119; 703/22; 716/4

(56) References Cited

U.S. PATENT DOCUMENTS 5,655,074 A * 8/1997 Rauscher ..................... 714/38

OTHER PUBLICATIONS

"Software Engineering Risk Management: Finding Your Path through the Jungle with Dale Karolak", http://www-.knowledgeharvesting.org/examples/serim.pdf.*

"Software Risk Management: Principles and Practices", B. Boehm, IEEE Software, vol.: 8 Issue: 1, Jan. 1991, pp. 32–41.*

"Empirically Guided Software Development Using Metric–Based Classification Trees", A. Porter and R. Selby, IEEE Software, vol.: 7 Issue: 2, Mar. 1990, pp. 46–54.*

"Risk Associated with Software Development: A Holistic Framework for Assessment and Management", C. Chittisler and Y. Haimes, IEEE Transactions on Systems, Man, and Cybernetics, vol.: 23 Issue: 3, May–Jun. 1993, pp. 710–723.*

"The Langalist: A Free Email Newsletter", Fred Langa, http://www.langa.com/newsletters/1999/man–14–99.html.*

Dale Walter Karolak, "Software Engineering Risk Management", 1996, IEEE Computer Society Press, pp. 1–171.*

* cited by examiner

Primary Examiner—Tuan Dam
Assistant Examiner—Eric B. Kiss
(74) Attorney, Agent, or Firm—Fenwick & West LLP

(57) ABSTRACT

A computer-implemented system and method for improving the efficiency of testing a process by focusing the testing in the highest risk areas of the process. One application of this computer-implemented system and method is in software testing to improve the effectiveness of software testing by focusing the testing efforts on the parts of the software that have a highest risk of failure and also by focusing the testing on the types of tests needed to reduce the risk.

29 Claims, 14 Drawing Sheets

FIG. 13

| Code Coverage Statistics—Perform Group | | | | | | | |
|---|---|---|---|---|---|---|---|
| Perform Group Name | Risk | McCabe | Verbs | Verbs Executed | Filtered | Filtered Executed | Paths |
| 2519-CHECK-SQL-T... | 858 | 2 | 5 | 0 (0%) | 1 | 0 (0%) | 2 |
| 3532-FD-PARA-NA... | 853 | 1 | 4 | 0 (0%) | 1 | 0 (0%) | 1 |
| 3420-UPDATE-DAT... | 853 | 1 | 6 | 0 (0%) | 1 | 0 (0%) | 1 |
| 1901-UNTIL-COUNTS | 853 | 3 | 6 | 5 (83%) | 1 | 0 (0%) | 3 |
| 9156-CALL-PP156 | 853 | 1 | 1 | 0 (0%) | 1 | 0 (0%) | 1 |
| 0510-PROCESS-R... | 852 | 2 | 3 | 2 (66%) | 2 | 1 (50%) | 2 |
| 3160-PROCESS-SE... | 474 | 16 | 33 | 32 (96%) | 2 | 2 (100%) | 11 |
| "PP110" | 473 | 12 | 20 | 20 (100%) | 6 | 6 (100%) | 6 |
| 1640-PROCESS-PR... | 470 | 10 | 12 | 1 (8%) | 1 | 1 (100%) | 6 |
| 1260-CHECK-END... | 469 | 14 | 18 | 16 (88%) | 1 | 1 (100%) | 10 |
| 1780-PROCESS-PE... | 469 | 8 | 26 | 26 (100%) | 2 | 2 (100%) | 7 |
| 1620-PROCESS-PR... | 467 | 7 | 37 | 37 (100%) | 1 | 1 (100%) | 7 |

RISK METRIC FOR TESTING SOFTWARE

RELATED APPLICATIONS

This application claims priority from U.S. provisional patent No. 60/134,177, filed May 13, 1999, assigned to the assignee of the present application, and which is hereby incorporated by reference in its entirety.

BACKGROUND OF THE INVENTION

1. Field of the Invention

The present invention relates generally to the field of testing and specifically to evaluating which software programs and portions of software programs are at the greatest risk of failure if they are not fully tested.

2. Description of the Background Art

Software developers commonly spend a great deal of time and money testing the computer programs they develop. This is especially true for development of so-called "mission critical" programs, such as those used in business accounting, payroll and billing systems.

Oftentimes, managers, developers and testers are unable to verify how well software has been tested in order to predict the likelihood that untested problems may emerge at some later time. Though extensive testing may have been undertaken, significant portions of the program logic may not have been exercised.

Software testing is viewed as an obstacle to production because it is time consuming and the costs of not testing are theoretical and uncertain. Consequently, software testing is often neglected. One way to balance deployment time with higher software quality resulting from thorough testing is to make testing and development as efficient as possible.

As software becomes increasingly more complex, testing the software also becomes more complex as a large number of unique combinations of paths and modules may be tested for each program. Therefore it is difficult to determine how much testing is sufficient to ensure a minimum level of quality in a software program to be shipped. One approach to software testing is to run as many tests as possible in a given time frame. However, this approach is inefficient because all of the tests may not be necessary and the testing is performed indiscriminately. Some other common inefficiencies in software testing include: testing a small portion of the application repetitively using production data, failing to identify and test all of the changed or impacted routines, placing the same priority on testing rarely-used and heavily-used routines, testing impossible paths or dead branches because they are there, and spending time sorting out problems that result from using bad test data.

Previous solutions to the testing efficiency problem have identified one risk factor and calculated one or more metrics that represent the individual risk factor. For example, a first risk metric may show a module's complexity, a second risk metric may indicate the number of changes in a module, and another metric may reveal the percentage of unexecuted statements in the module. If these individual metrics were combined, the combination was accomplished by adding or multiplying the individual risk metrics together with individual weighting factors. The result of this conventional method is to generate a single number that falls within a continuous range of values in which the magnitude of the generated number indicates whether the program being tested is either good or bad. While this method may be sufficient to identify programs that may have problems, the conventional method does not enable a method to let the user determine which factors were present in the program by simply observing the value of the generated number. Additionally, the conventional method does not provide convenient way to group programs having similar problems, an option which is also useful to the software developer.

What is needed is an improved system and method for enabling more efficient testing of computer programs. It would be desirable for this improved system and method to combine individual risk factors to produce a single risk metric based on the combination of factors that also indicates which individual risk factors were present in the program. In particular, it would be desirable for the single risk metric to enable a comparison of the relative riskiness of multiple programs or portions of a program, and to indicate to which individual risk factor the greatest amount of testing efforts should be devoted.

SUMMARY OF THE INVENTION

In accordance with the present invention, there is provided a system and method for enabling software testing to efficiently focus on areas of a program that are most at risk for failure if not completely tested. In one embodiment, a single risk metric is calculated which indicates the relative risk of not thoroughly testing the program or a portion of the program. The risk metric is determined based on one or more prioritized factors that indicate the risk of failure of the program or the portion of the program. In a preferred embodiment, a set of ranges is generated for each factor of the test. The value of the generated risk metric will fall within one of the ranges which indicates to the user the most important factor to be tested. Thus, the value of the risk metric indicates which type of tests should be performed based on which range the risk metric falls within. Further, the single risk metric can be used to compare programs or portions of a program to each other to reveal which have the highest risk and therefore should be tested first.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 13 is a perform group summary display portion of a user interface in accordance with the present invention.

DETAILED DESCRIPTION OF THE PREFERRED EMBODIMENTS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
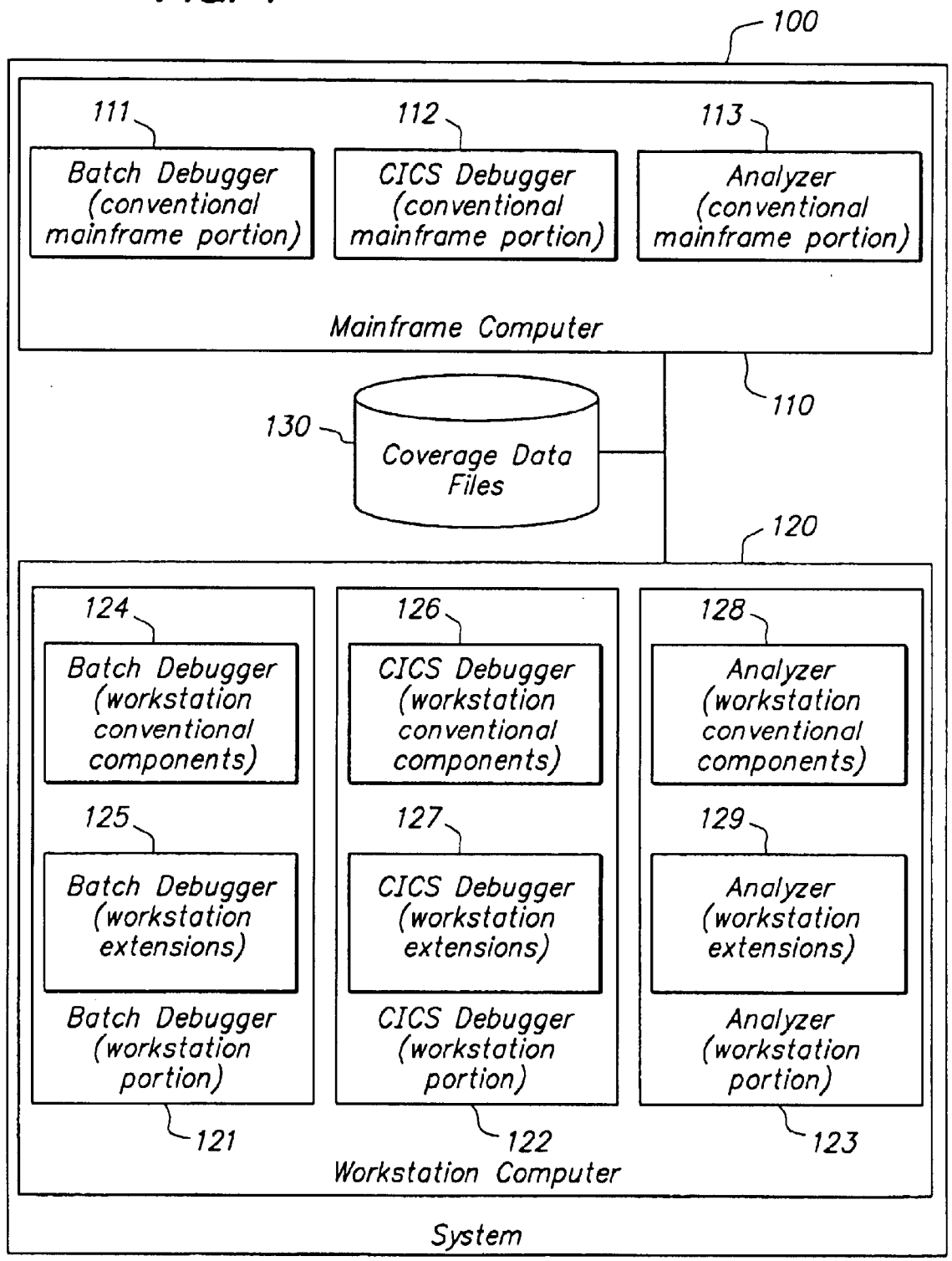
FIG. 1 is a block diagram of the overall architecture of an embodiment of a software testing system in accordance with the present invention.

Referring now to FIG. 1, there is shown a block diagram of the overall architecture of a software testing system 100 in accordance with the present invention. The example shown in FIG. 1 includes both a batch debugger 111/121 and a CICS debugger 112/122. These debuggers provide test coverage data stored in coverage data file subsystem 130. An analyzer subsystem 113/123 uses this data as input for determining test coverage as detailed below.

In a preferred embodiment, the subsystems described above are implemented in part on a mainframe computer 110 and in part on a workstation computer 120, and for purposes of illustration, each of the debugger and analyzer subsystems 111/121, 112/122, and 113/123 are shown as having mainframe portions (i.e., 111, 112, and 113, respectively) and workstation portions (i.e., 121, 122, 123, respectively). Those skilled in the art will recognize that in some applications, any or all of these components may be distributed as shown, may reside solely on a either mainframe computer 110 or workstation computer 120, or may be distributed among other processing devices, as desired.

In a preferred embodiment, batch debugger 111/121 is implemented as workstation extensions 125 operating with a conventional batch debugger 111/124 implemented partially on mainframe computer 110 and partially on workstation 120. In a preferred embodiment, conventional batch debugger 111/124 is implemented by the XPEDITER batch debugger product available from Compuware Corporation in Farmington Hills, Mich. The extensions 125 to this product are as described below. Those knowledgeable about conventional batch debuggers will recognize that extensions as described herein, or other modifications, could readily be made to other conventional batch debuggers as well in order to achieve the operation described herein.

More specifically, in a preferred embodiment, a Begin Coverage extension is made to conventional batch debugger 111/124 to automate the setting of the execution counters. Additionally, a Save Coverage extension is made to retrieve the values of the execution counters and save them to the coverage data file subsystem 130. These extensions are described in greater detail below.

In a preferred embodiment, CICS debugger 112/122 is implemented as workstation extensions 127 operating with a conventional CICS debugger 112/126, in this case the XPEDITER CICS debugger product available from Compuware Corporation. The extensions to this product are as described below. Again, those knowledgeable about conventional CICS debuggers will recognize that extensions as described herein, or other modifications, could readily be made to other conventional CICS debuggers as well in order to achieve the operation described herein. A Begin Coverage extension is made to automate the setting of the execution counters. A Save Coverage extension is made to retrieve the values of the execution counters and save them to the coverage data file subsystem 130.

In a preferred embodiment, coverage data files subsystem 130 is implemented by a conventional file storage system.

In a preferred embodiment, analyzer 113/123 is also implemented by extending a conventional analysis system, as described below. In a preferred embodiment, the XPEDITER+analysis system provided by Compuware Corporation is extended to provide analyzer 113/123. Those knowledgeable about analysis subsystems will recognize that extensions as described herein, or other modifications, could readily be made to other conventional analysis subsystems in order to achieve the operation described herein.

In a preferred embodiment, batch debugger 111/121, CICS debugger 112/122, and analyzer 113/123 are integrated into a single software package referred to herein as a "workbench." In a preferred embodiment portions 121, 122 of the batch and CICS debugger subsystems providing user interface functions, as well as the entire analyzer 123 are implemented to be operable on workstation computer 120, which is a conventional personal computer, such as produced by IBM, DELL and Compaq. While FIG. 1 shows that portions of the analyzer 113 may also be implemented for operation on mainframe computer 110, in a preferred embodiment the conventional analyzer does not have any mainframe portion 113, and the analyzer is entirely implemented by an analyzer subsystem 123 operable on workstation computer 120. Those skilled in the art will recognize that other implementations could make use of a mainframe analyzer portion 113, particularly in instances where there are such conventional mainframe analyzer components. In a preferred embodiment, the batch and CICS debuggers include conventional mainframe components 111 and 112 implemented on mainframe computer 110, which is a conventional mainframe computer system, such as an IBM System/390. It should be recognized that other implementations could also be used in accordance with the present invention. Notably, an advantage provided in accordance with the present invention is that mainframe components 111, 112, and even 113 (if applicable) require no extension or modification of any sort.

Therefore, embodiments of the invention may be implemented using mainframe systems having existing debuggers and analyzers without making any changes whatsoever to the mainframe components of such debuggers/analyzers. This provides a potential advantage in not disrupting in any way other uses that may be made of such conventional mainframe components, as well as obviating the need for program development work on both the workstation and mainframe platforms.

Workstation subsystems for the batch debugger 121, CICS debugger 122, and analyzer 123 each contain components from existing conventional debuggers/analyzers, 124, 126, 128, as well as corresponding extensions 125, 127, 129 to provide the operation described herein.

From a user's perspective, system 100 provides the user with useful graphical and report representations of how well given test cases actually tested a software program under test. At the most general level, system 100 provides the user with information as to how much of the program, and which particular portions, were executed during the test. System 100 accomplishes this by combining run-time data from the debuggers 111/121, 112/122 with static data from analyzer 113/123. Debuggers 111/121, 112/122 provide information about which program statements were executed during the test, and analyzer 113/123 provides graphical display of how those statements are related in the program.

More specifically from the user's viewpoint system 100 is operated as follows. First, the user starts the batch or CICS debugger 111/121 or 112/122 that corresponds to the program under test, and loads the program to be tested. The appropriate debugger is extended to present the user with a menu item to "begin test coverage." In the case of either debugger, this will cause an execution counter to be set for each statement in the program under test with an initial value of 0. The user is also given the option to set normal breakpoints to control program execution. The user then executes whatever conventional tests are desired, and when the tests are complete, selects a "save coverage data" menu item to save the results on the user's workstation. In a preferred embodiment, if the user attempts to exit the debugger before saving the results, the user is prompted by the debugger to save it before exiting. The data saved as a result consists of the line number and count (i.e., number of times executed) for each line of the program that was executed. The data are saved in storage subsystem 130.

Once such data have been saved, the user operates the conventional portion of the analyzer 128 to load in and analyze the static structure of the program under test. Specifically, in a preferred embodiment, this is done by executing the analyzer program with the name of the file containing the program as a parameter. For example, the following command will analyze the program.

MYPROG.CBL: XPPANLZ MYPROG.CBL.

Figure 2:
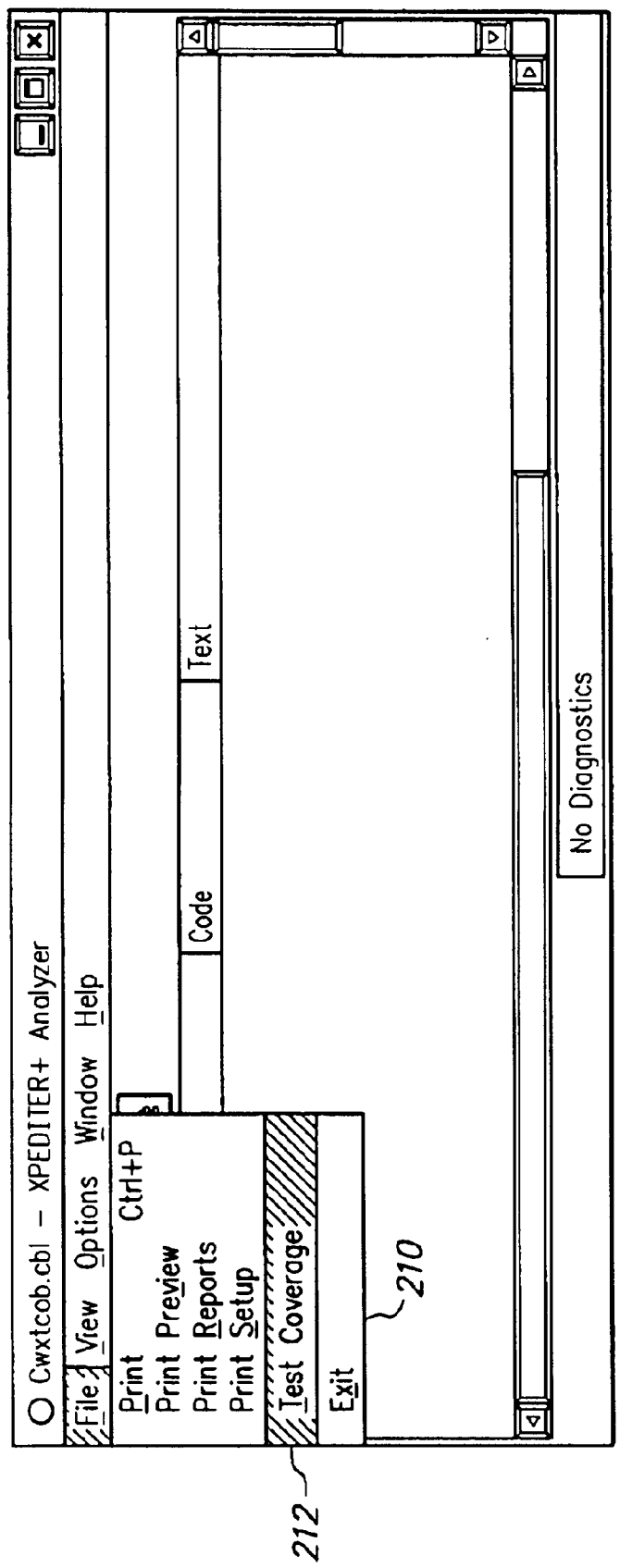
FIG. 2 is an analyzer menu portion of a user interface of the embodiment of FIG. 1 in accordance with the present invention.

By performing conventional static analysis of the program at this point, the user ensures that all program files have correctly been loaded into the user's workstation and that test coverage analysis can later be performed successfully. Referring now also to FIG. 2, a user interface 200 implemented by the analyzer 113/123 provides a menu 210 including a choice to commence test coverage 212, and when the user makes this choice analyzer 113/123 permits the user to select one or more coverage files previously created and stored in storage subsystem 130 as described above. In a preferred embodiment, if conventional analysis was not successful, menu 210 will not allow the user to choose to commence test coverage 212, thus indicating to the user that conventional analysis needs to be completed. Also in a preferred embodiment, the user can re-select the "test coverage" choice 212 on menu 210 as desired to add more test results to the current analysis session.

When the user's selections are complete, analyzer 113/123 provides the user with three representations of the test results: a first representation at the statement level via summary reports; a second graphical representation via a structure chart; and a third, also graphical, representation via control flow diagrams. Each of these is described in greater detail below.

If, based on the information presented in one of these manners to the user, the user determines that additional testing is required, the user can generate additional coverage files by re-running the corresponding debugger with additional data or under different test conditions. The results of this additional testing can then be imported into an existing analysis session or a new session, reflecting all of the cumulative test results.

Turning now from an operation perspective to an implementation perspective, in a preferred embodiment conventional debuggers and a conventional analyzer are used as the foundation for system 100, and are extended to provide the operation described above.

Specifically, each of the debuggers 111/121, 112/122 is configured so that when the user selects a "begin test coverage" menu choice, the debugger will cause a "count all" command to be sent from the user's workstation 120 to the mainframe computer 10 executing the test program. As a result, whenever a program statement is executed, the debugger increments the statement's execution count in mainframe memory.

In addition, when the program under test encounters a breakpoint (or the end of the program), the debugger is configured to download all of the count information generated on the mainframe computer 110 to the local memory of the user's workstation 120. In an alternative embodiment that may be advantageous for large or complex programs under test, this download does not occur until the user explicitly directs it via a menu choice or other command. Once downloaded to the temporary memory of the workstation 130 (e.g., workstation RAM), the data are available for the user to save to storage using the "save coverage data" menu choice described above.

In a preferred embodiment, the "save coverage data" menu choice stores the count information to a file in a "COVERAGE" subdirectory of the workstation 120, where the workbench is installed. In a preferred embodiment, the file name used for the data is set to be the name of the program under test with a numeric extension automatically generated for each test. For example, if the program under test is named "GARMENT", the first time the user saves coverage data the file name will be GARMENT.001 and the next time the user saves coverage data the file name used will be GARMENT.002.

In a preferred embodiment, debuggers 111/121 and 112/122 each store the data in a binary file with the format shown in table 1 below.

TABLE 1

| Size | Type | Description |
| --- | --- | --- |
| 8 | Char | Module name |
| 8 | Char | Compile date |
| 8 | Char | Compile time |
| 8 | Char | Current date |
| 8 | Char | Current time |
| 4 | unsigned long | Number of counts |
| 4 | unsigned long | Line number |
| 4 | unsigned long | Execution count |

The last two elements shown in Table 1 are repeated "number of counts" times in the file.

Once the data have been saved, the user is given the option of running more tests and saving the results in a new file, or resetting all counts before running additional tests. The first option permits the user to create files with cumulative data as described above, while the second permits the user to record each test separately. If the data are stored in separate files, the analyzer 113/123 can be used to import these separate files at a later time to provide cumulative results. This gives the user the flexibility to view the results individually or cumulatively.

Figure 3:
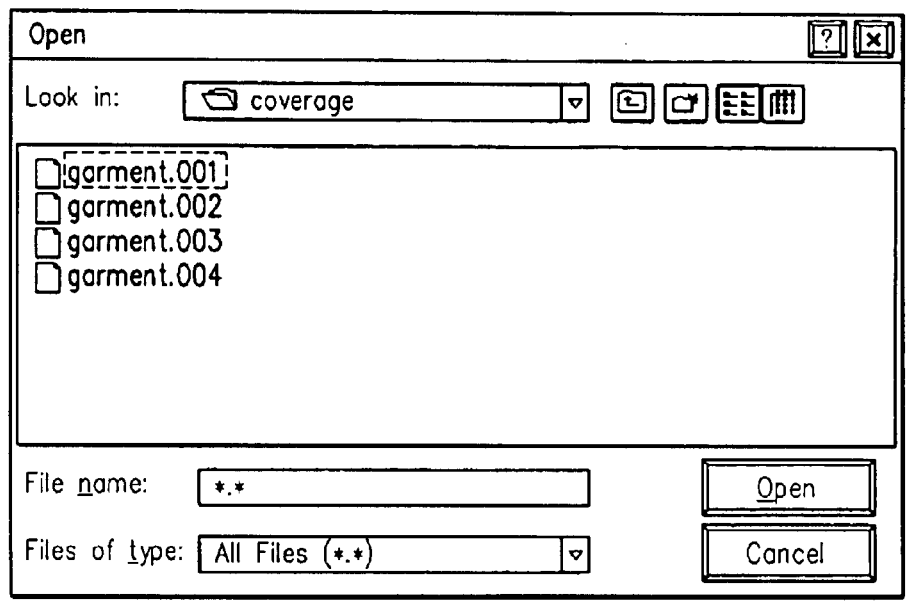
FIG. 3 is an open file dialog portion of the user interface in accordance with the present invention.

Once the desired data files are saved, the user commences operation of the analyzer 113/123 portion of system 100. Upon selection of the "Test Coverage" choice from menu 200 as described above, a conventional Windows dialog box is presented to the user for selection of one or more files to load. Continuing the example discussed above, if there were four data files generated for the GARMENT program, the dialog 300 of FIG. 3 is presented to the user in the preferred embodiment. Analyzer 113/123 is configured to read the line and count information from each file selected from such dialog 300.

Analyzer 113/123 performs its operations in two major phases: syntax checking (or "parsing") and analysis. If desired by the user, analyzer 113/123 also undertakes a third phase of determining code coverage.

During syntax checking, in the case of a COBOL program under test, each line of the program under test is read and stored in an in-memory object. Each line is then parsed, the syntax is checked, and a statement (Stmt) object is created for each statement on each line, in a conventional manner.

Once the syntax checking, or parsing, phase is complete, the actual analysis of the code begins. Analysis includes reporting code flaws, producing graphs, generating data flow information, and in the embodiment discussed herein, applying Code Coverage data. Analysis commences by a process known as "path walk" that gathers analysis information. In a preferred embodiment, a module CBLProg::DoPathWalk( ) implements this process. The path walk algorithm starts at the entry point of the program under test and steps through each possible path in the program, during which it stores pertinent information about the statements in each path.

In a preferred embodiment, the path walk is implemented using a stack in a ControlGraph::ProcessStackForPathlk method. A new ControlGraph object is created whenever an entry point or a COBOL PERFORM statement is encountered. Each statement in every ControlGraph is processed. When a conditional statement is processed, a new path is added to the ControlGraph stack. The pathwalk algorithm commences at the first statement of the PROCEDURE division of the program under test and traverses each possible processing path within the program from beginning to end. During analysis, all perform groups are identified, and each statement object is associated with one or more of these perform groups. A perform group is a set of one or more statements in a COBOL program that are executed as a group when called from another statement (the PERFORM statement). After the last statement in a perform group executes, the statement immediately after the calling statement executes. A perform group in a COBOL program is analogous to a function in other languages.

Analyzer 113/123 stores each of the statements within a perform group as a control flow graph. After the pathwalk algorithm is complete, a structure chart is created by combining the individual control flow graphs. The data in the control flow and structure graphs are then used to create the diagrams that are displayed and printed as part of the conventional analyzer.

Specifically, in a preferred embodiment, analyzer 113/123 stores each line of the COBOL program under test in an array of CBLString objects. The array is indexed by a statement number, known as sourceLine, relating to the corresponding line of the COBOL program. In a preferred embodiment, the underlying object used is conventional and has a format as shown in Table 2 below:

TABLE 2

```
class_export CBLString:public FormatString
{
private:
    Array<CharReplacement *>   *charReps;
    BOOL                        copybook;
    long                        fileLine;
    long                        sourceLine;
    short                       dot;
    String                      *filename;
    unsigned int                stmtTypes;
    unsigned int                typeQualifiers;
    String                      *col73to80;
}
```

Analyzer 113/123 modifies the object to include an additional field called unsigned int execution_count, which is initialized to zero when the original program is loaded. When each coverage data file is loaded, the count for each line is added to this field. This allows coverage files to be added at any time after the program is analyzed.

As previously mentioned, Statement objects are used to build the control flow and structure graphs. These objects contain both information about the statement itself and the original source line number. In a preferred embodiment, the statement object format used (pertinent portion shown) is that shown in Table 3:

TABLE 3

```
class_export Stmt:public Item
{
private:
    enum resolvedStatus {rsUnknown, rsAlways, rsSometimes, rsNever};
    BOOL        is_conditional;
    BOOL        is_invisible;
    BOOL        is_relevant;
    BOOL        isDead;
    BOOL        leader;         // basic block info (Aho pg 529).
    short       path_number;
    short       range_attr;
    short       scope;          // scoping level
    int         nodeNumber;     // used by the graph generator
protected:
    BOOL        performLoops;   // for perfom stmts only
    KEYWORD*    keyword;        // Verb information
    long        fileLine;
    long        sourceLine;
    Reference   *reference1;    // list of fields referenced
    short       column;
    Stmt*       flowNext:       // next statement
```

Control Flow charts and structure charts are both derived from FlowGraph objects. Each FlowGraph has a graph member variable that is an array of Node structures. Each Node structure contains lists of "to" edges and "from" edges (lines that flow to and from a box in a graph), as well as a node_item. If the graph is for a Control Flow, the node_item is a Stmt object. If the graph is for a Structure chart, the node_item is a ControlGraph object.

Once the path walk has completed successfully, the Control Flow charts are built using a process that commences with the module CBLProg::BuildControlFlowCharts. A chart is built for each ControlGraph object that was created during the path walk. The process for creating the Control Flow charts is similar to the path walk in that a stack is used in the ControlGraph::ProcessStackForGraph method. Not all statements are graphed; a node in a Control Flow may represent one or many statements, but does not in a preferred embodiment represent more than one conditional statement.

After the Control Flow charts are built, the Structure Charts are built. One Structure Chart is built for every entry point in the program, with a node being created in the Structure Chart for every Control Flow chart.

As also mentioned previously, system 100 presents the user with information about test coverage on three levels: at the statement level, in summary form, and graphically. For display at the statement level, system 100 modifies a conventional source listing report to include an initial column showing the number of times the line has been executed, as shown below in Table 4:

TABLE 4

|          | 000363*** |                                                          |
|          | 000364*** | DIFFERENT PROCESSING OCCURS BASED ON EMPLOYEE TYPE. THERE |
|          | 000365*** | ARE 3 VALID EMPLOYEE TYPES. IF A RECORD IS READ CONTAINING |
|          | 0Q0366*** | A RECORD TYPE OTHER THAN H, S OR M, AN ERROR MESSAGE IS |
|          | 000367*** | WRITTEN AND PROCESSING CONTINUES. |
|          | 000368*** |                                                          |
| 0005     | 000369    | 1000-PROCESS-DATA.                                       |
| 0005     | 000370    | IF HOURLY                                                |
| 0004     | 000371    |   PERFORM 2000-PROCESS-HOURLY                            |
|          | 000372    | ELSE                                                     |
| 0001     | 0Q0373    |   IF SALES                                               |
| 0000***  | 000374    |     PERFORM 3000-PROCESS-SALES                           |
|          | 000375    |   ELSE                                                   |
| 0001     | 000376    |     IF MANAGEMENT                                        |
| 0001     | 000377    |       PERFORM 4000-PROCESS-MANAGEMENT                    |
|          | 000378    |     ELSE                                                 |
| 0000***  | 000379    |       MOVE 'INVALID EMPLOYEE TYPE' TO ERROR-LINE         |
| 0000***  | 000380    |       WRITE REPORT-RECORD FROM ERROR-LINE.               |
| 0005     | 000381    | PERFORM 8000-READ-INPUT.                                 |

Figure 4:
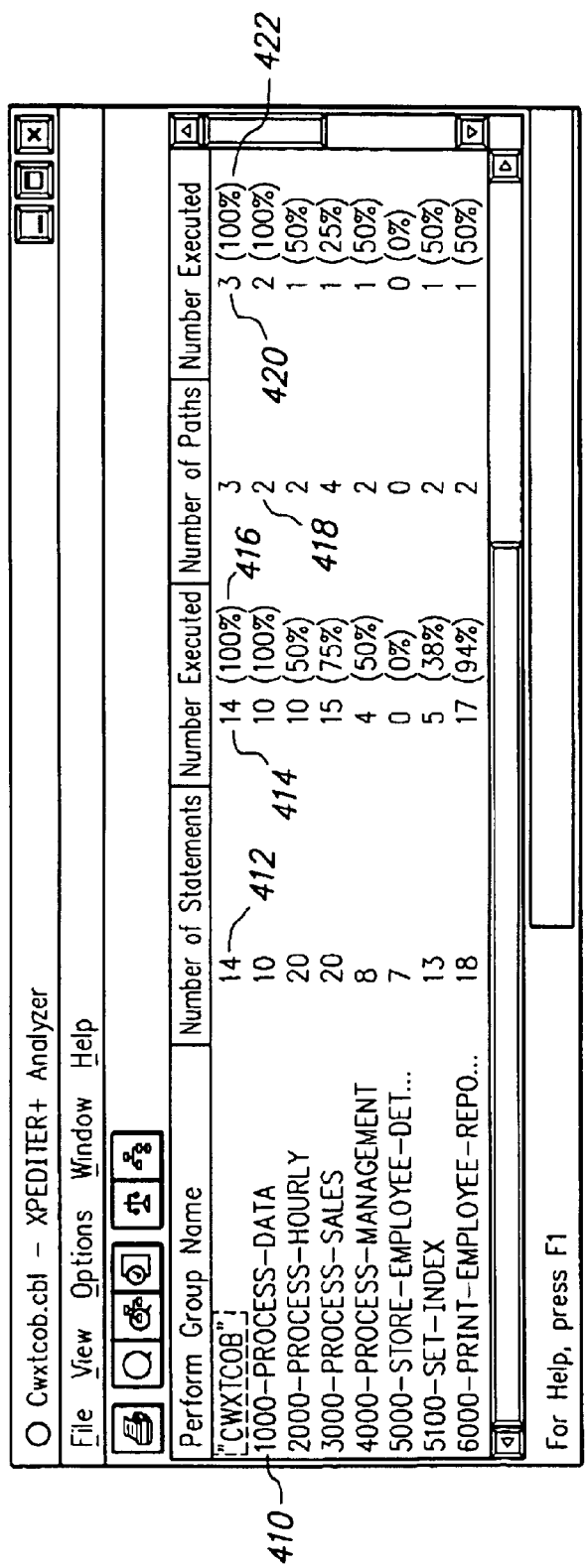
FIG. 4 is a perform group summary display portion of the user interface in accordance with the present invention.

System 100 presents summary information in two formats. The first, illustrated for example in the window 400 of FIG. 4, provides a row for each perform group, e.g., row 410, and columns containing the number of statements 412, the number 414 and percentage 416 of statements executed, the number of paths 418, and the number 420 and percentage 422 of paths executed. In an embodiment in which risk metrics are generated, as discussed below, an additional column displaying risk metrics for each perform group is also provided.

The number of paths represents the minimum number of unique paths that must be executed to test all logic. In a preferred embodiment, the analyzer 113/123 uses an algorithm to determine from the execution data whether or not a particular logical path in the program has been executed. The algorithm determines whether a path has been taken based on the number of times the decision block has been executed and the number of times the statements coming out of the decision block have been executed. If a decision block has been executed more times than the statement(s) coming out of the decision block, then, as long as the statement(s) coming out of the decision block have been executed at least once, it is certain that all of the paths out of the decision block have been executed.

For example, consider the program discussed previously and reprinted below:

begin
b=input data;
if b>0, then b=b+3;
output=sqrt(b);
end.

In this case, if the decision block (if b>0) has been executed three times, and the statement leading out of the decision block (then b=b+3) has been executed twice, then it is known that path 1:
if b>0
then b=b+3
output=sqrt(b)
has been executed (in the above example, it has been executed twice). Also, it is known that path 2:
if b>0
output=sqrt(b)
has been executed (in the above example, it has been executed once). Thus, it is known all paths leading from this decision block have been executed.

If the decision block has been executed the same number of times as the statements leading out of the decision block, then it is known that only the paths incorporating the statements leading out of the decision block have been executed. Any paths that do not incorporate the statements leading out of the decision block have not been executed. In the above example, if the decision block has been executed twice and the statement leading out of the decision block has been executed twice, then it is known that path 1 has executed, and path 2 has not executed.

If the statements coming out of the decision block have not been executed, and the decision block has been executed, then it is known that only the path that does not involve the statements coming out of the decision block have been executed. In the above example, if the decision block has executed twice, and the 'then' statement has not been executed, then it is known that path 2 has been executed twice, and path 1 has not been executed at all. Finally, if the decision block has not been executed, then it is known that all paths coming out of the decision block have not been executed.

Figure 5:
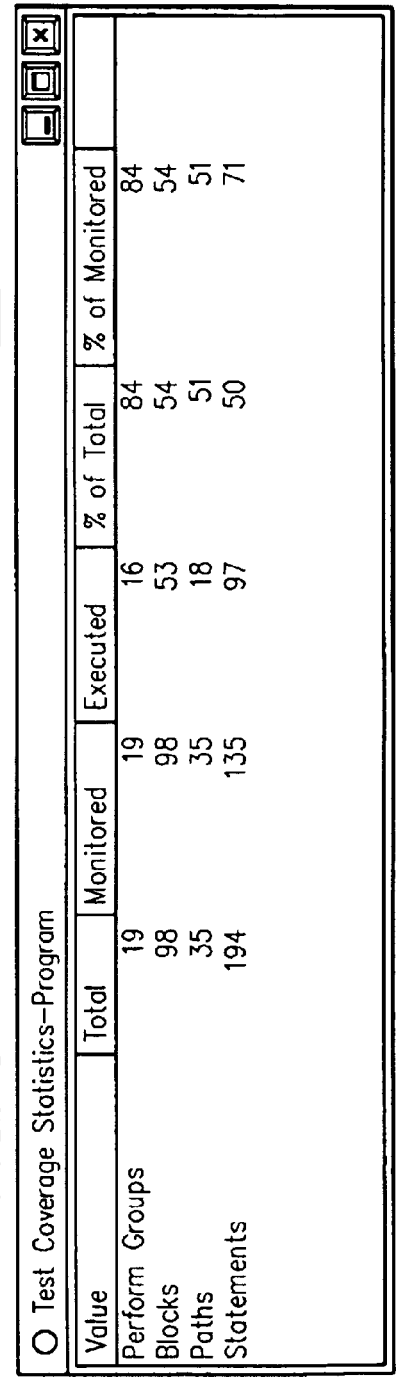
FIG. 5 is a test coverage statistics display portion of the user interface in accordance with the present invention.

The second format of summary information is presented for the overall program under test. Referring now to FIG. 5, window 500 displays the total number of perform groups, blocks (i.e., one or more sequential non-conditional statements, or a single conditional statement), paths (i.e., a set of blocks connecting the entry point of a perform group to the exit), and statements, as well as the number and percentage of those that were monitored (i.e., specifically selected through the debugger for test coverage analysis) and executed.

In a preferred embodiment, the user may choose to print any of the windows, e.g., 500, that are displayed on the user's workstation.

Figure 6:
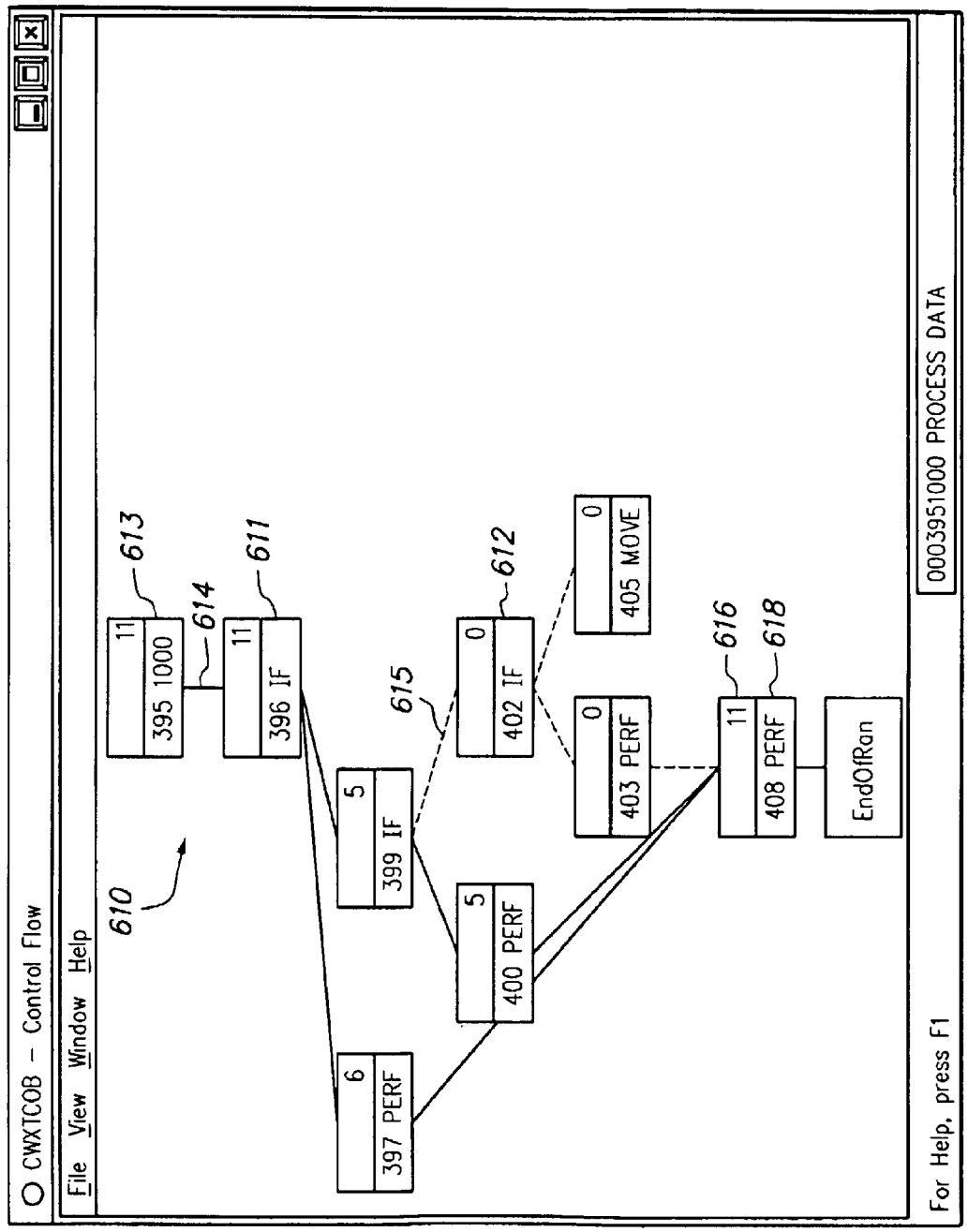
FIG. 6 is a control flow diagram portion of the user interface in accordance with the present invention.

Referring now to FIG. 6, coverage information is displayed graphically in control flow diagrams and structure charts using colors and numbers. Specifically, in a control flow diagram 610 in interface 600, each box, e.g., 613, represents either a conditional or non-conditional statement of the program under test. When coverage data are loaded for the program under test, a number (e.g., 11 in upper portion 616 for box 618) is displayed in the upper portion of each box showing how many times the corresponding statement has been executed in the testing. The corresponding code block line number and verb are displayed in the lower part of the box. Executed paths, e.g., 614 are displayed differently than unexecuted paths, e.g., 615. In a preferred embodiment, the former are displayed by blue solid lines while the latter are displayed by red dashed lines; green lines are used for inconclusive or unmonitored results. Likewise, executed statements, e.g., 613, 611 are displayed differently than unexecuted statements, e.g., 612. In a preferred embodiment, executed statements are displayed as gray boxes while unexecuted statements are displayed as yellow boxes.

Figure 7:
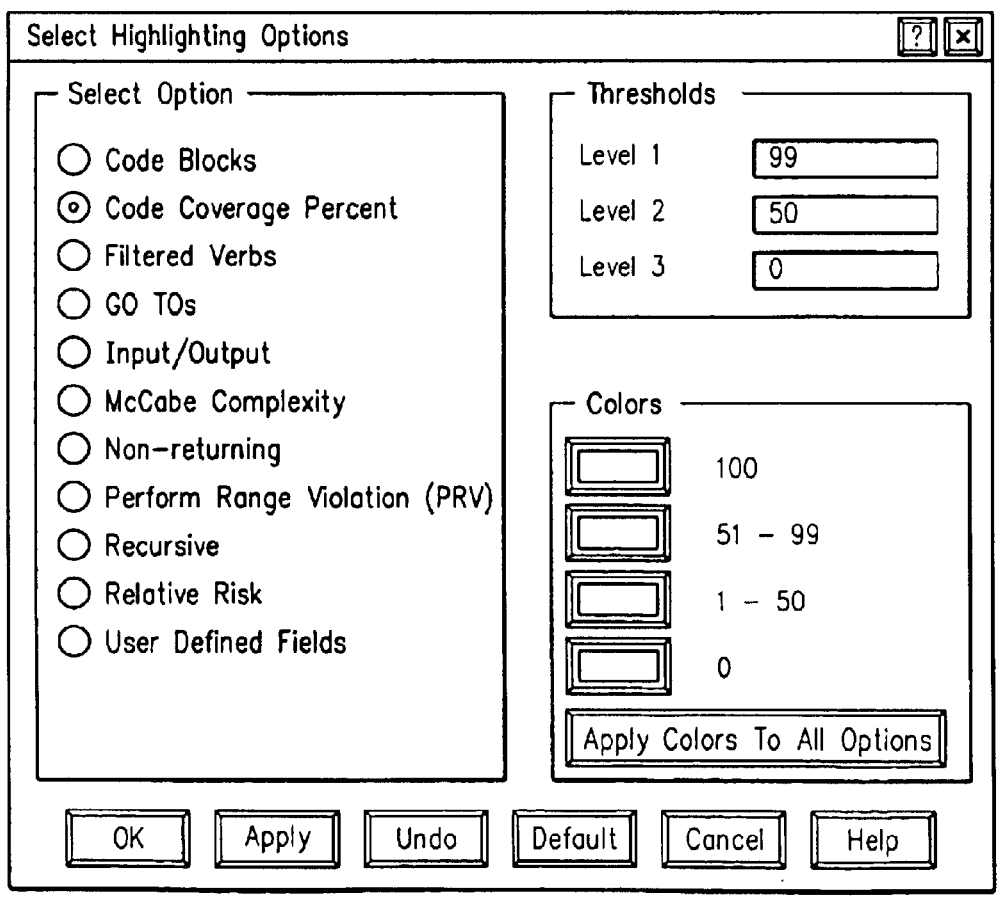
FIG. 7 is a highlighting options portion of the user interface in accordance with the present invention.

Similarly, system 100 displays coverage results graphically using colors in a structure chart. In a preferred embodiment, a user is presented with a selection of highlighting options as shown in window 700 of FIG. 7. Using this device, the user can select attributes of the program to emphasize and can further set threshold levels for each color to be displayed. For the example shown in FIG. 7, the relevant option is Code Coverage Percent. Selecting this option allows the user to assign different colors to the boxes on the structure chart depending on the percentage of statements within the box that were executed. In a preferred embodiment, as a default a gray box indicates 100% coverage, a blue box indicates 51–99% coverage, a green box indicates 1–50% coverage, and a yellow box indicates 0% coverage.

Figure 8:
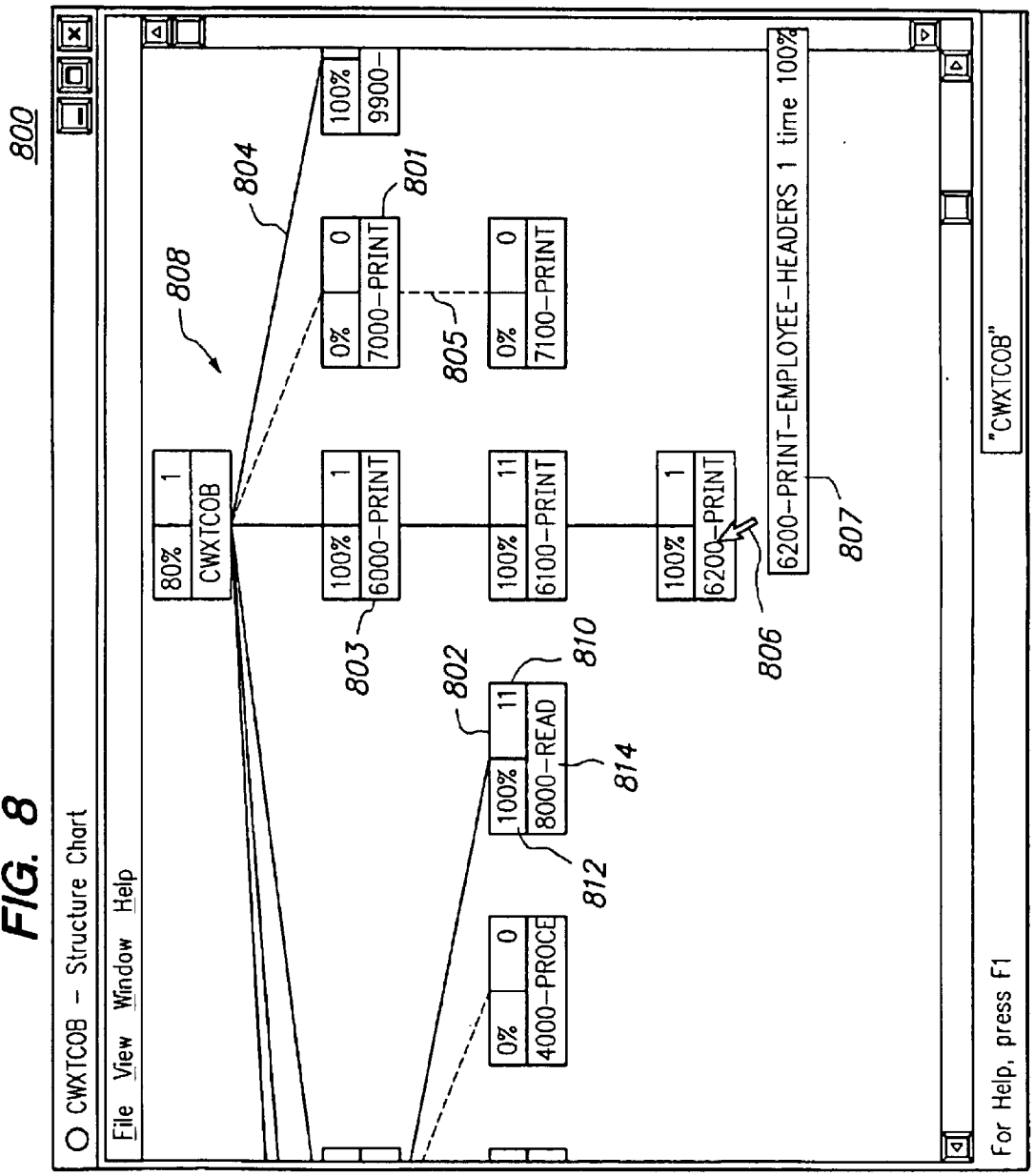
FIG. 8 is a structure chart display portion of the user interface in accordance with the present invention.

Referring now to FIG. 8, there is shown an exemplary structure chart 808 in an interface 800, in accordance with the present invention. In this case, each box, e.g., 801 and 803, corresponds to a perform group. Numbers, e.g., 11 in box 802, are displayed in the upper-right corner of the box to indicate the number of times 810 the perform group has been called; lines, e.g., 804, again represent paths. Numbers, e.g., 100% in box 802, are displayed in the upper-left corner of the box to indicate the percentage of the statements 812 within the perform group that have been executed. The perform group name 814 is provided in the bottom portion of the box. As with the flow display, in a preferred embodiment the use of the colors and dashed lines indicates unexecuted paths, e.g., 805. In a preferred embodiment, a blue line represents an executed path, a red dashed line represents an unexecuted path, and a green line represents an inconclusive or unmonitored path. An inconclusive path is one that may or may not have been followed; it is inconclusive because the analyzer is unable to determine if the path was followed. An unmonitored path includes statements for which the user did not set a count breakpoint on in the debugger; no code coverage data are collected for statements without counts in a preferred embodiment. For user convenience, when a cursor 806 is positioned over a box corresponding to a perform group, a description 807 of that perform group is displayed on chart 808. Chart 808 provides an easy way for a user to quickly identify which parts of a program have been executed during a test and which have not. If a perform group is only partially covered as indicated by a percentage less than 100%, it is straightforward to display the control flow diagram and see which paths were not executed by clicking the right mouse button on the box and selecting the Control Flow item on the popup menu.

In a preferred embodiment, the user may select to display only a portion of a program's structure chart, allowing the user to quickly focus in on parts of the program believed to be most impacted by a particular code change. This is accomplished by clicking the right mouse button on the chart background and selecting the Set Chart Depth menu item.

Also in a preferred embodiment, system 100 permits a user to invoke a "Find Indirect" feature in which the user can select a data item and then identify all other data items moved into or out of that one. For example, assume that the programmer changes a data item called HIRE-YEAR from a 2-digit field to a 4-digit field. Assume further that the program contains a statement like: "MOVE HIRE-YEAR TO A-YEAR". The find indirect operation on the data item HIRE-YEAR will identify A-YEAR, as a programmer in this situation would typically want to test not only all of the code that references HIRE-YEAR, but also all of the code that references A-YEAR. Specifically, the feature highlights on structure chart 800 each perform group that contains one of the selected data names in red. This can result in time savings during testing since the user can quickly identify which perform groups that use a data field impacted by a code change have been executed during the testing done subsequent to that code change.

As described above, a user is provided a menu for loading a coverage file generated by one of the debuggers 111/121 or 112/122. As described in Table 1 above, this coverage file contains an array of line numbers and execution frequencies. A LoadTestCoverage method in CBLProg takes the line numbers and matches them with CBLStrings, as well as applying corresponding execution frequencies. Then, a CalcCoverageData method of each ControlGraph is called to apply the execution data to the Control Flows. Execution frequencies are applied to both the Nodes and the Edges of the graphs, and from this information the path coverage is calculated. Structure Charts are similarly processed. The charts are then rendered with graphical attributes such as lines and boxes, as described above. When the charts are rendered, corresponding lines and boxes with different attributes showing coverage are drawn as previously discussed.

One practical advantage of system 100 is that it does not require any significant modification to existing mainframe debugging portions of existing debugging tools. Rather, system 100 is built upon these tools through the use of additional code portions resident only on the user's workstation.

Figure 9:
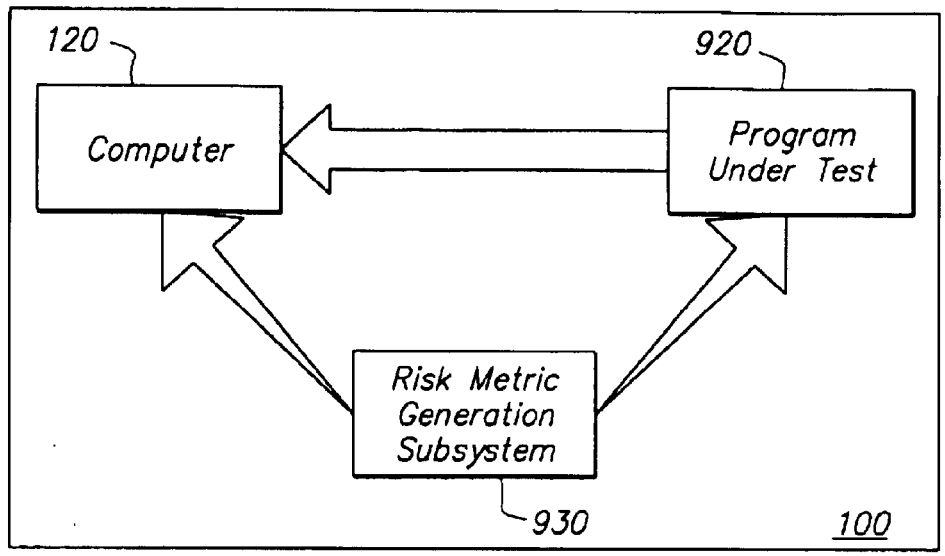
FIG. 9 is a block diagram of a system on which a risk management system in accordance with the present invention is implemented.

Referring now to FIG. 9, there is shown a block diagram of system 100 in which a risk management subsystem 930 in accordance with the present invention is implemented. In one embodiment, the analyzer 113/123 provides risk metric information in addition to the functionalities described above. In another embodiment, risk metrics are generated independent of analyzer 113/123. A program under test 920 runs on workstation computer 120. A program under test 920 may be a software system (collection of programs), a software program, a portion of a software program, or the like. A risk metric generation subsystem 930 also runs on computer 120. The risk metric generation subsystem 930 determines a risk metric for the program under test 920. In a preferred embodiment, the program under test 920 is a portion of a program. In this embodiment, the comparative risk of other portions of the same program is also evaluated using the risk metric generation subsystem 930. Thus, the risk metric generation subsystem 930 may be executed more than one time on different portions of the same program. For each portion, a risk metric is determined and compared to the risk metrics for every other portion.

Figure 10:
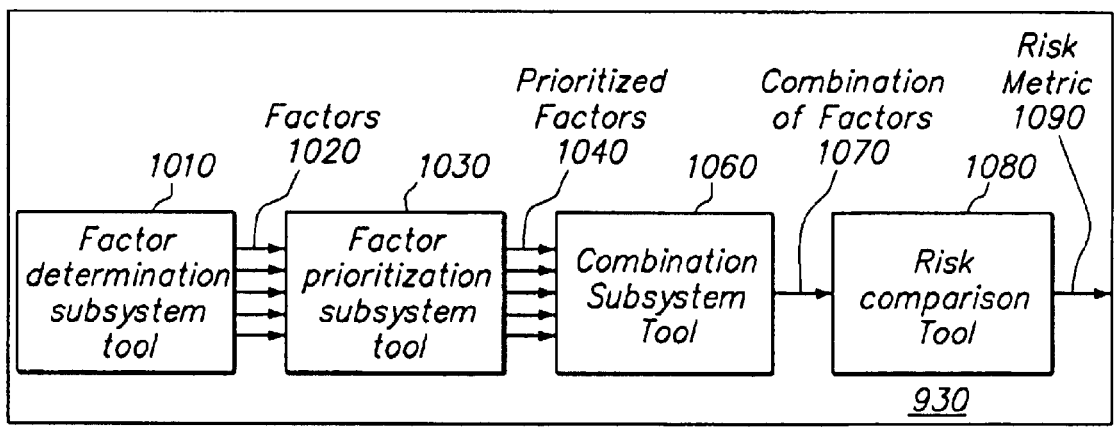
FIG. 10 is a block diagram of the overall architecture of an embodiment of the risk metric generation subsystem.

Referring now to FIG. 10, there is shown a block diagram of the overall architecture of an embodiment of the risk metric generation subsystem 930. The risk metric generation subsystem 930 has several components. In a preferred embodiment, a factor determination subsystem tool 1010 is included. This component determines the factors 1020 that are relevant to determining the risk of failure of a program or program module. In a preferred embodiment, the factors 1020 include: changed code that has not been tested, code affected by application data changes that has not been tested, changed code that has been tested, code affected by application data changes that has been tested, and the relative complexity of the code. In a preferred embodiment, the factors 1020 are determined by user input. In another embodiment, the factors 1020 are predetermined using a set of factors such as those discussed above.

The factors 1020 that are important to determining the risk of failure of a program are prioritized in the factor prioritization subsystem tool 1030. In a preferred embodiment, the factors are prioritized by user input. In another embodiment, the factors 1020 are prioritized by a predetermined priority. The prioritized factors 1040 are then combined into a combination of factors 1070 in the combination tool subsystem 1060. Thus, the output of the risk generation subsystem 930 is based on a combination of the factors 1070 instead of a single factor. The combination of factors 1070 is then input into a risk comparison tool subsystem 1080. The risk comparison tool 1080 produces a risk metric 1090 associated with a program under test 920. The risk metric 1090 identifies the relative risks of failure of the program under test 920.

As discussed above, a software program 920 may be divided into portions and a risk metric 1090 calculated for each portion. Thus, in this embodiment, the present invention allows the user to compare the risk metrics 1090 of the various portions of the software program 920 to each other to identify the portions of the software program 920 with the highest risk.

The program under test 920 could also be an entire software program. In that embodiment, the risk metric 1090 of one software program 920 would be compared to the risk metric 1090 of another software program 920 to determine the software program with the highest risk. Thus, the system of the present invention enables a software developer to quickly identify on which program or program module to concentrate test efforts. This greatly increases the efficiency of the test process.

The risk metric 1090 also indicates which of the factors 1020 was present in the program having the risk of failure. In a preferred embodiment, each factor 1020 corresponds to a different range of risk metrics 1090. Therefore, the range a risk metric 1090 falls within indicates the highest priority factors 220 present in the risk analysis of the program under test 920.

In a preferred embodiment, the factors 1020 and their corresponding ranges are shown in table 5 below.

TABLE 5

| Factor | Range of Risk Metric |
| --- | --- |
| Number of unexecuted filtered verbs | above 800 |
| Number of unexecuted user defined fields | 600–799 |
| Number of executed filtered verbs | 400–599 |

TABLE 5-continued

| Factor | Range of Risk Metric |
| --- | --- |
| Number of executed user defined fields | 200–399 |
| Percentage of code unexecuted, number of calculation verbs, program complexity | 1–199 |

In a preferred embodiment, there are five ranges corresponding to the five factors used to analyze the risk of not thoroughly testing software. Only one of the factors needs to exist for a value to be calculated. The first factor in the preferred embodiment is the unexecuted filtered verbs. The number of unexecuted filtered verbs is a count of the unexecuted filtered verbs in the program under test 920. Filtered verbs are verbs (or statements) contained on lines of code in the program under test 920 that have been modified. Modified lines of code are identified by comments inserted into modified lines indicating that the lines have been modified. The comments can be inserted by the programmer making the change or by a software tool that compares two files. In a preferred embodiment, the programs with the highest risk contain unexecuted filtered verbs.

The number of unexecuted user defined fields is a count of the unexecuted user defined fields in the program under test 920. User defined fields are specific data names that match one or more substrings specified in a user defined group. A user defined group is a list of substrings, or partial data names, that are used to search a program under test 920 for specific data names that match. For example, a user defined group called Y2K might contain the substrings: YR, DATE, and YEAR. Each line containing one of these fields would be found. When applied to a program under test 920, the fields LAST-YR, TODAYS-DATE, and HIRE-YEAR would be found. In a preferred embodiment, this factor can be significant if the changes made to a program under test 920 are related to changing specific data fields.

The number of executed filtered verbs is a count of the executed filtered verbs. The number of executed user defined fields is a count of the executed user defined fields. Executed filtered verbs and fields are important, because even if they are executed the user should verify that the appropriate data was used to thoroughly test the changes.

The final factor is a measure of program complexity weighted by the percentage of unexecuted statements. The complexity of the program or portion of a program is calculated using the industry standard cyclomatic complexity algorithm. If there is not sufficient information to calculate cyclomatic complexity, a count of the number of statements can be used. The number of calculation verbs (i.e., verbs that modify data) is then added to the complexity. This result is then multiplied by the percentage of code that is unexecuted, if the percentage is greater than zero. The percentage of code unexecuted is the higher of: the percentage of verbs unexecuted and the percentage of branches unexecuted. Using the higher percentage ensures that the maximum risk is calculated. Combining all of these values into a single factor helps to distinguish between programs that have similar complexities. The values of the above-described factors can be obtained from coverage data 130 and analyzer 113/123, as discussed above, or from a debugging and analysis program, such as the XPEDITER+™ program available from Compuware Corporation. The range value allows a user to immediately understand which filter is present in a program under test 920. For example, referring to FIG. 13, which illustrates a perform group summary interface as discussed previously in connection with FIG. 4 modified to display risk metric 1090 in accordance with the present invention, for the output of the "pp110" module, the risk metric 1090 is 473. Using the above ranges, a user viewing the user interface of FIG. 13 will immediately know that there are executed filtered verbs because the value of the risk metric 1090 is 473, which lies within the Number of Executed Filtered Verbs factor range of 400–599. In contrast, upon viewing the value of the risk metric 1090 of the module "CHECK-SQL . . . "of 858, the user would know that unexecuted filtered verbs are present in the module.

An additional advantage of the risk metric generation subsystem 930 is that it is independent of the specific factors used to calculate risk. The risk metric is valid as long as the same factors are used to calculate the risk for all of the parts of a single program. Different factors can be used for the parts of a different program (e.g., programs written in different programming languages) and to calculate the risk at the program level.

Figure 11:
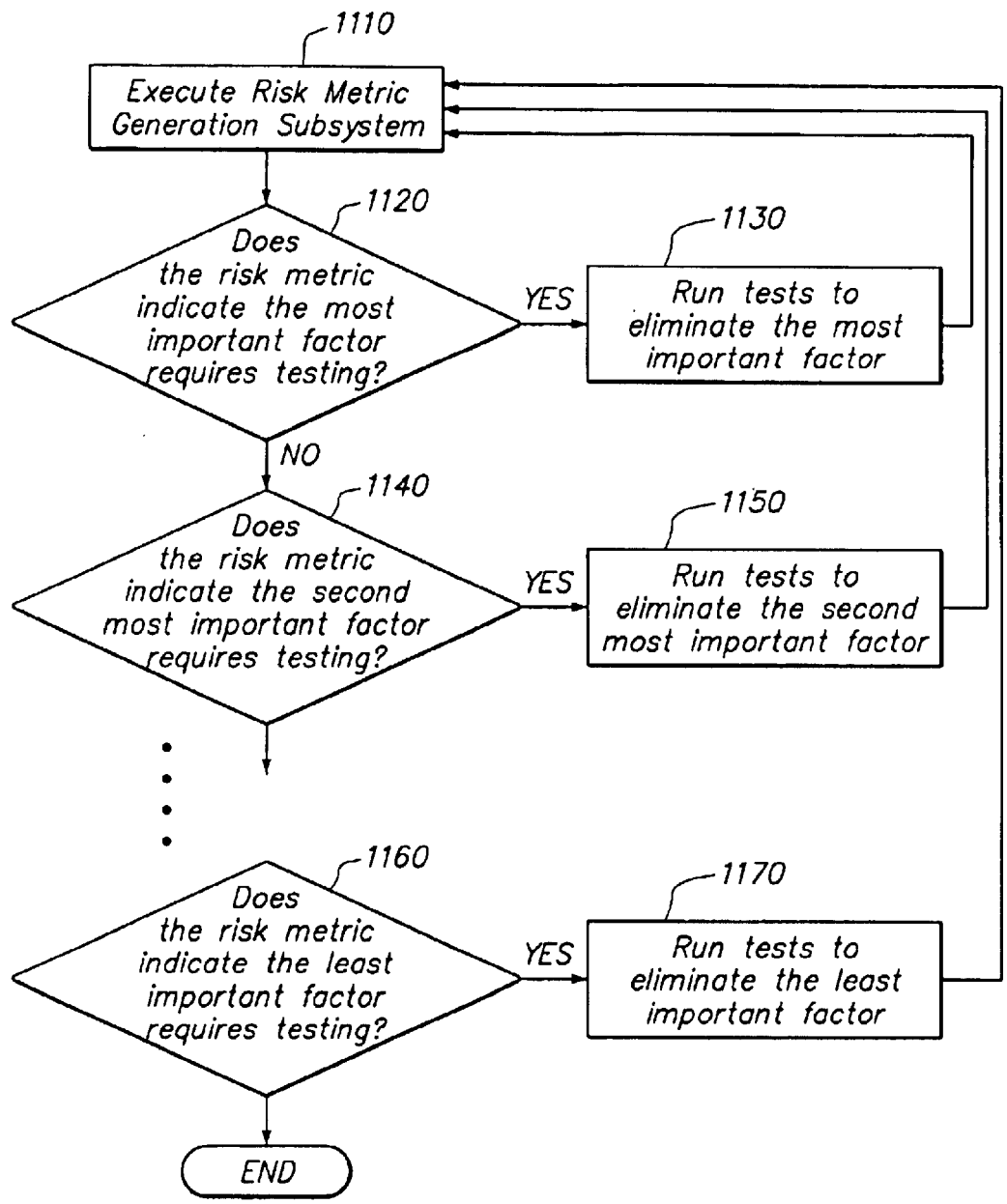
FIG. 11 is a flowchart of the overall testing process of an embodiment of the risk metric generation subsystem.

Now referring to FIG. 11, there is shown a flowchart of the overall testing process of an embodiment of the risk metric generation subsystem 930. The risk metric generation subsystem 930 can be used prior to testing to identify the programs or parts of programs where testing efforts should be focused. The risk metric generation subsystem 930 can also be used after running tests to determine if more testing is required, to determine what areas of the program require more testing, and what types of tests should be executed.

Once the risk metric generation subsystem 930 has been executed 1110 and a risk metric 1090 is obtained as a result, in a preferred embodiment, the value of the risk metric 1090 indicates which of the factors 1040 is the most important factor to test. In this embodiment, the ranges are structured to identify the most problematic risk factors. For example, in the exemplary embodiment of Table 5, if the risk metric 1090 is above 800, then the most important factor, the unexecuted filtered verb factor, is present and should be tested 1120. When a program under test 920 contains at least one unexecuted filtered verb those paths should be tested 1130 prior to production of that program. From the risk metric 1090 a user can quickly identify whether the unexecuted filtered verbs should be tested 1120 and can focus 1130 test efforts on that factor if necessary.

In one embodiment, a program under test 120 with a risk metric 1090 above 800 is highlighted in a manner such that the program under test 120 having this risk factor is distinguishable from other parts of the code that may have lower risk factors. Thus, by highlighting the portions of programs or programs having the highest risk factors, the user can quickly identify where the testing efforts should focus.

In a preferred embodiment, before the software goes into production it should be tested further if the risk metric 1090 is above 800. After the user has tested the unexecuted filtered verbs, the risk generation subsystem can be executed again 1110 to verify the completion 1120 of unexecuted filtered verb tests and also to identify 1140 and 1160 the other factors present in the program or part of program. After the risk metric generation subsystem 930 is executed for a second time 1110, if the risk metric 1090 is still above 800, then the user can quickly identify whether more testing of unexecuted filtered verbs should be performed. If the risk metric is between 600 and 799, then the second most important factor determined is present and it is the most important factor present 1140. In a preferred embodiment, the second most important factor is the number of unexecuted user defined fields. From obtaining a risk metric 1090 between 600 and 799 the user can quickly identify the unexecuted user defined fields should be more thoroughly tested 1150 prior to production.

After the user has tested the unexecuted user defined fields, the risk generation subsystem 930 can be executed again 1110 to verify the completion of the unexecuted user defined field tests and to identify 1160 the other factors present in the program under test 920. After the risk metric generation subsystem 930 has been executed for a third time 1110, if the risk metric 1090 is still between 600 and 799, then the user can quickly identify whether more testing of unexecuted user defined fields should be performed. If the risk metric 1090 is between 400 and 599, then the third most important factor determined is present and it is the most important factor present 1160. Therefore, the third most important factor should be tested 1170 prior to the software production. This process of executing the risk metric generation subsystem 930 followed by tests of the most important factor present continues iteratively until the risk metric 1090 falls below a level considered acceptable for software production. In one embodiment, the acceptable level for the risk metric 1090 is considered to be 400, where the two least important factors are number of executed user defined fields and a combination of percentage of code unexecuted, number of calculation verbs, and program complexity.

The risk metric 1090 can also be used to focus testing efforts on one or more portions or modules of a program. One program can be broken up into many portions. The risk metric generation subsystem 930 can be executed on each portion. For a single program the risk metric generation subsystem 930 may calculate many risk metrics 1090. These risk metrics 1090 can be compared to each other for an indication of the areas of the program requiring further testing prior to production.

Figure 14:
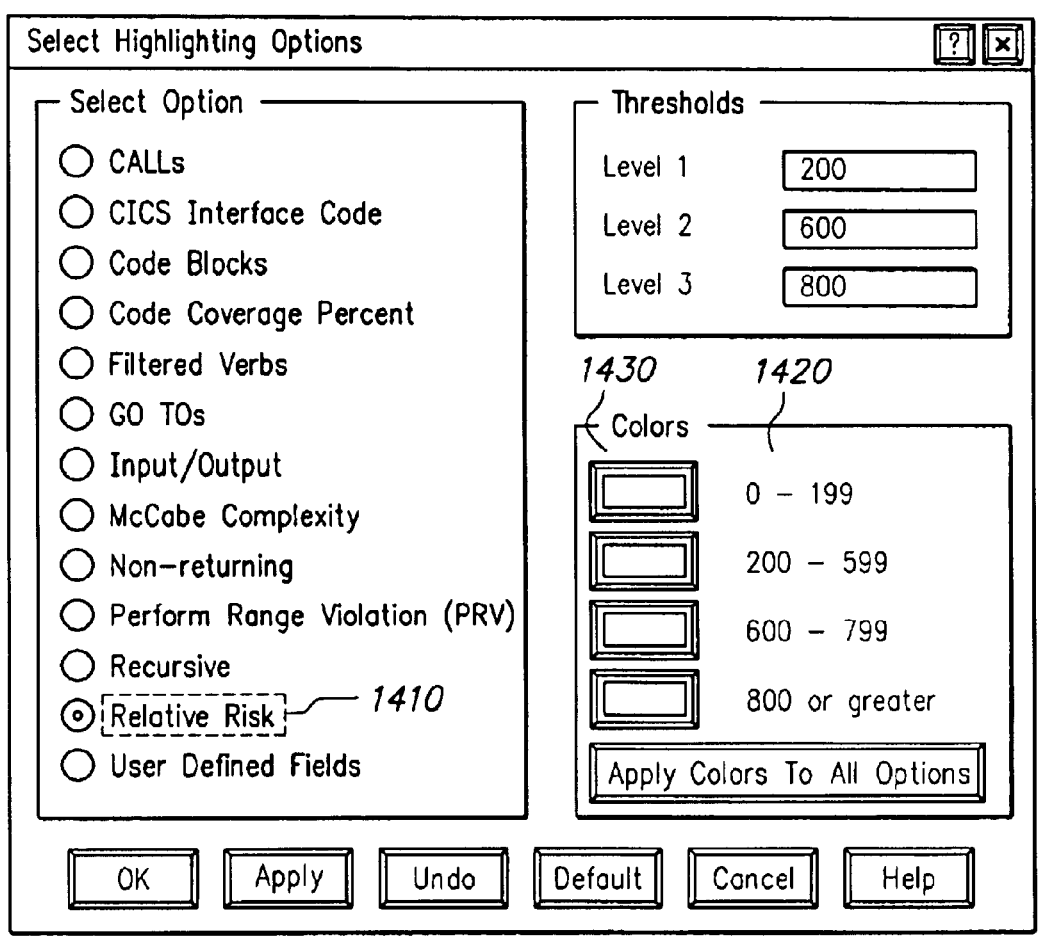
FIG. 14 is a highlighting option portion of the user interface in accordance with the present invention.

An advantage of using the risk metric generation subsystem 930 to focus testing efforts in the highest risk areas of a software program is that the risk metric combines one or more factors into a single metric whose value falls within a specified range, as described above. This enables different programs or modules to be compared very easily. FIG. 14 illustrates one embodiment of a user interface described in FIG. 7 that allows a user to select modules to be highlighted according to the risk metric 1090. Using this device, the user can select attributes of the program to emphasize and can further set threshold levels for each color to be displayed. Thus, as shown in FIG. 14, a user can select the "Relative Risk" option 1410 from the user interface 1400, and then ranges 1420 for the different factors 1020 are displayed next to suggested colors 1430. In one embodiment, the colors are selectable by the user to suit the user's preferences.

Figure 15:
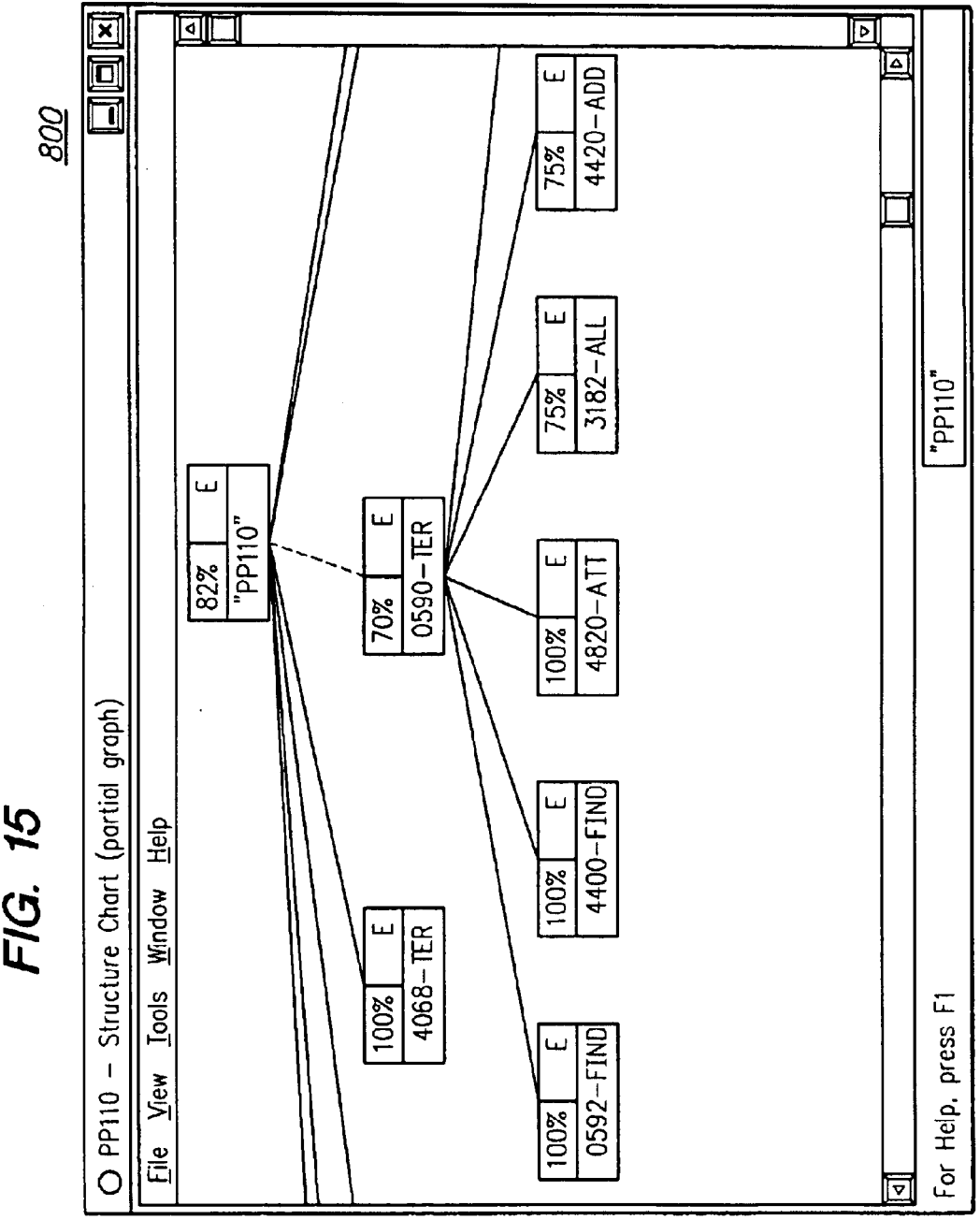
FIG. 15 is a structure chart display portion of the user interface in accordance with the present invention.

Referring now to FIG. 15, there is shown an exemplary structure chart 800 as described previously in connection with FIG. 8. However, in accordance with the present invention, each box is displayed in a color corresponding to its risk metric 1090. Thus, chart 800 provides an easy way for a user to quickly identify the risk metrics 1090 of different parts of a program under test 920 by simply viewing the color of the different perform group modules.

In a preferred embodiment, the ranges of risk metrics 1090 were chosen so they would not be so large as to seem unreasonable and not so small that many programs would have the same value. The risk metric 1090 must fall within an appropriate range indicating the factors 1020 present. It is not enough to truncate the value because that might likely result in a large group of programs with the same value at the top of the range. In a preferred embodiment, a logarithm function along with a multiplier is used to produce a somewhat distributed set of values within the range. Occasionally, a value may need to be truncated to keep it within the range. However, this will be a rare occurrence and the fact that the value is at the top if the range will indicate the significance of the factor corresponding to that range. Within a range, the value of the risk metric 1090 will be based on all the previous factors 1020. Therefore, if two programs have the same number of unexecuted filtered verbs, it will be the executed filtered verbs, user defined fields and complexity that determine which has the highest risk. The risk metric 1090 is a tool to compare the risk of programs.

Figure 12:
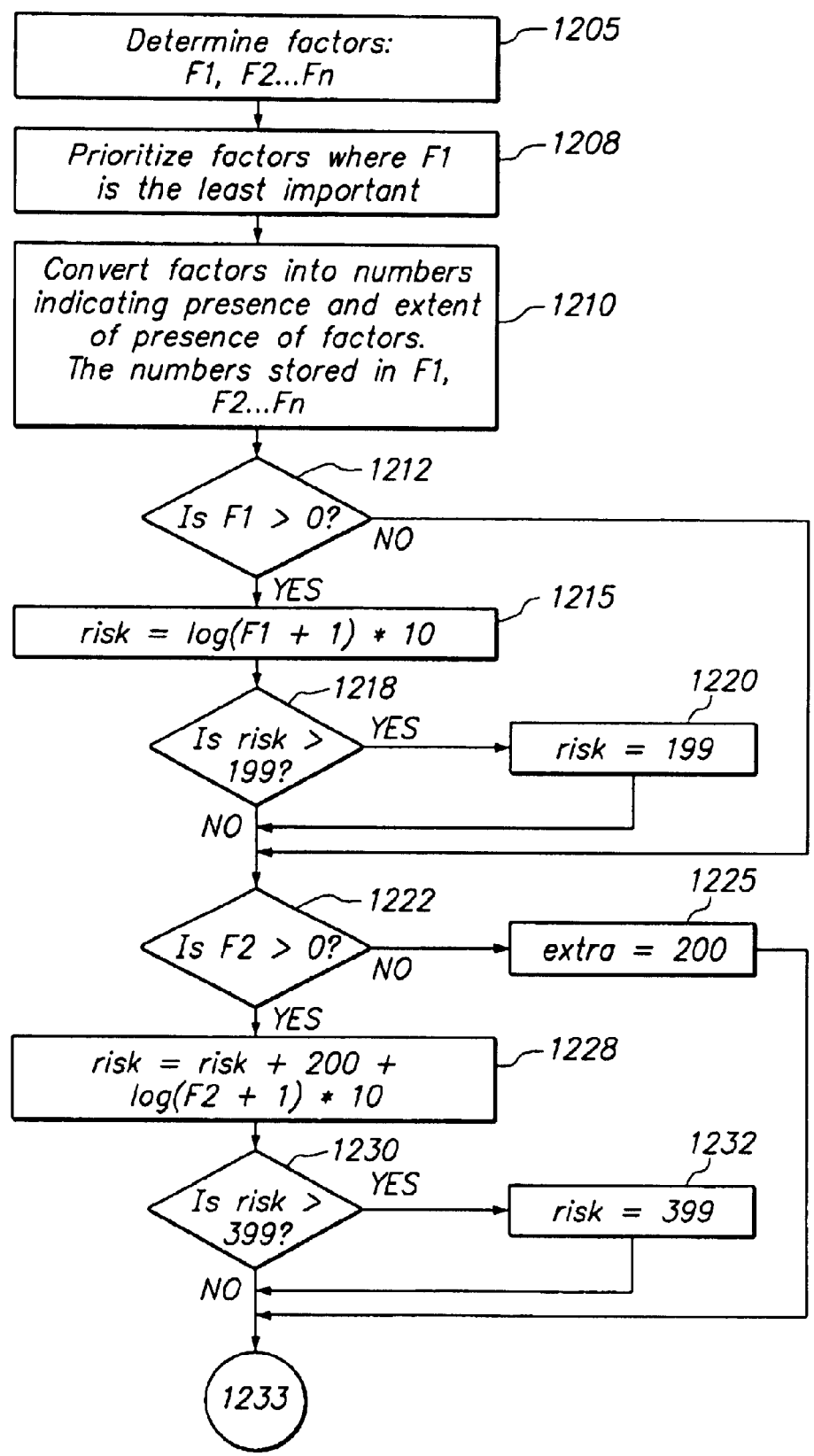
FIG. 12 is flowchart of an algorithm of an embodiment of the risk metric generation subsystem.
Figure 12:
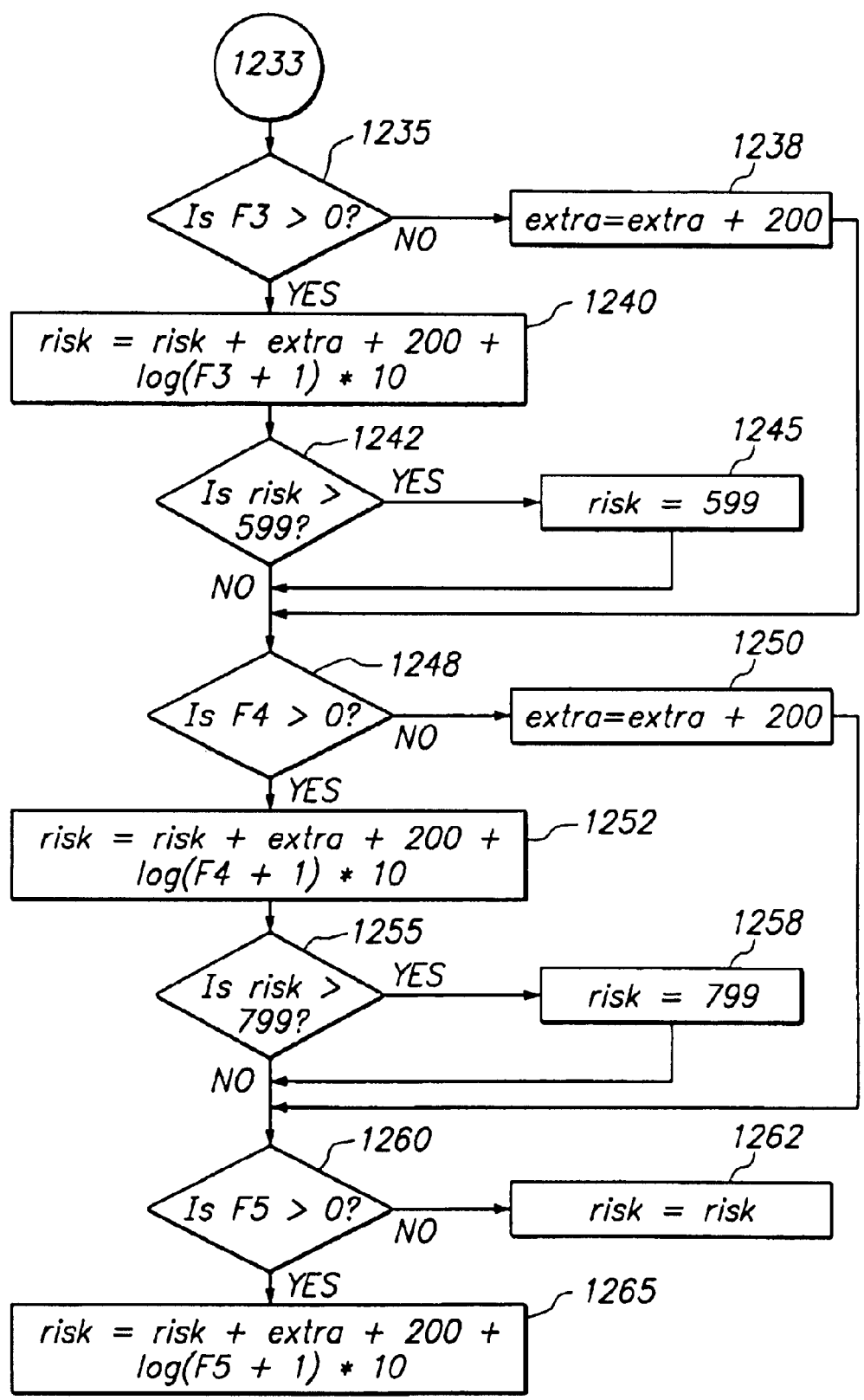

Now referring to FIG. 12, there is shown a flowchart of an algorithm of an embodiment of the risk metric generation subsystem 930. Prior to any risk analysis, the factors 1020 important to evaluating risk 1090 must be determined 1205. In a preferred embodiment, the factors 1020 are determined by user input. In another embodiment, the factors 1020 are determined by a predetermined set of factors. The number of factors 1020 can be from 2 to N, where N is any positive integer. In a preferred embodiment, there are five factors 1020, or N equals five, as described above. The factors 1020 are then prioritized 1208 where F1 is the least important factor and FN is the most important factor. The counts corresponding 1210 to each factor 1020 in the program under test 920 are determined by executing the risk metric generation subsystem 930. For one embodiment, the counts corresponding to each factor 1020 are stored 1210 in variables F1 through FN, respectively.

The factors 1020 are combined and the risk metric 1090 is calculated 1212–1265 in its appropriate range. As discussed above, the values of the above factors 1020 can be generated from a debugger such as XPEDITER+ or other conventional program analyzers. However, the actual generation of the factor values is not critical to the application of the present invention.

Because a zero value of any one of the variables F1 through FN will yield an undefined value of a logarithm, if the value of any one of the variables F1 through FN is not greater than zero 1212, 1222, 1235, 1248, 1260, the logarithm is not calculated for that variable. Similarly, because the logarithm of the value one is zero, if the value of any one of the variables F1 through FN is greater than zero, the value of one will be added to it to ensure the result is not zero. To determine the value of the risk metric 1090 due to the least important factor, if F1 is greater than zero, the logarithm of F1 (the least important factor) is calculated and multiplied 1215 by a factor of ten. If the logarithm multiplied by ten is greater than the highest number in the lowest range 1218, then the risk metric 1090 is truncated and becomes 1220 the highest number in the lowest range. A running total of the risk metric 1090 is equal 1220 to the highest number in the lowest range. In a preferred embodiment, the ranges span 200 with the highest number in the lowest range being 199.

If the value of F2 is not greater than zero 1222, a placeholder variable will be set 1225 to the value of the span of the ranges. In a preferred embodiment, the value of the span of the ranges is 200. If the value of F2" is greater than zero, then the logarithm of F2 will be calculated and multiplied 1228 by ten to find the component of the risk metric due to F2. In a preferred embodiment, the variable risk, indicating the running total of the value of the risk metric, is set to the sum 1228 of the previous running total of the risk metric and 200 (the value of the span of the ranges) and the risk metric due to F2 (the logarithm of F2 times ten). If the variable risk is greater than the highest number in the next range 1230, then the risk metric 1090 is truncated and becomes 1232 the highest number in the next range. FIG. 12 includes a placeholder 1233 to show the continuity between the first and second pages of the flow chart. A similar process to that regarding F2 is taken with respect to F3. Evaluate whether F3 is greater than zero 1235. If F3 is not greater than zero, then the placeholder variable is incremented 1238 by another 200. The running total of the risk metric 1090 is equal to the sum 1240 of the component of the risk metric 1090 from the previous factors and 200 and the component of the risk metric from F3. The component of the risk metric from F3 is the logarithm of F3 multiplied 1240 by ten. If the risk metric is greater 1242 than 599 it is truncated 1245 at 599.

In a preferred embodiment, a similar process occurs 1248–1258 to include the component of the risk metric 1090 from the fourth factor, F4. Evaluate whether F4 is greater than zero 1248. If F4 is not greater than zero, then the placeholder variable is incremented 1250 by another 200. The running total of the risk metric 1090 is equal to the sum i252 of the component of the risk metric 1090 from the previous factors and 200 and the component of the risk metric from F4. The component of the risk metric from F4 is the logarithm of F4 multiplied 1252 by ten. If the risk metric is greater 1255 than 799 it is truncated 1258 at 799. For the most important factor, FN (or F5 in a preferred embodiment), FN is checked 1260 to ensure that it is greater than zero. If not, then the risk metric 1090 is equal 1262 to the running total of risk metrics from the first N–1 factors If FN is greater than zero, then the component of the risk metric 1090 from FN is included 1265 in the running total of the risk metric.

Figure 16:
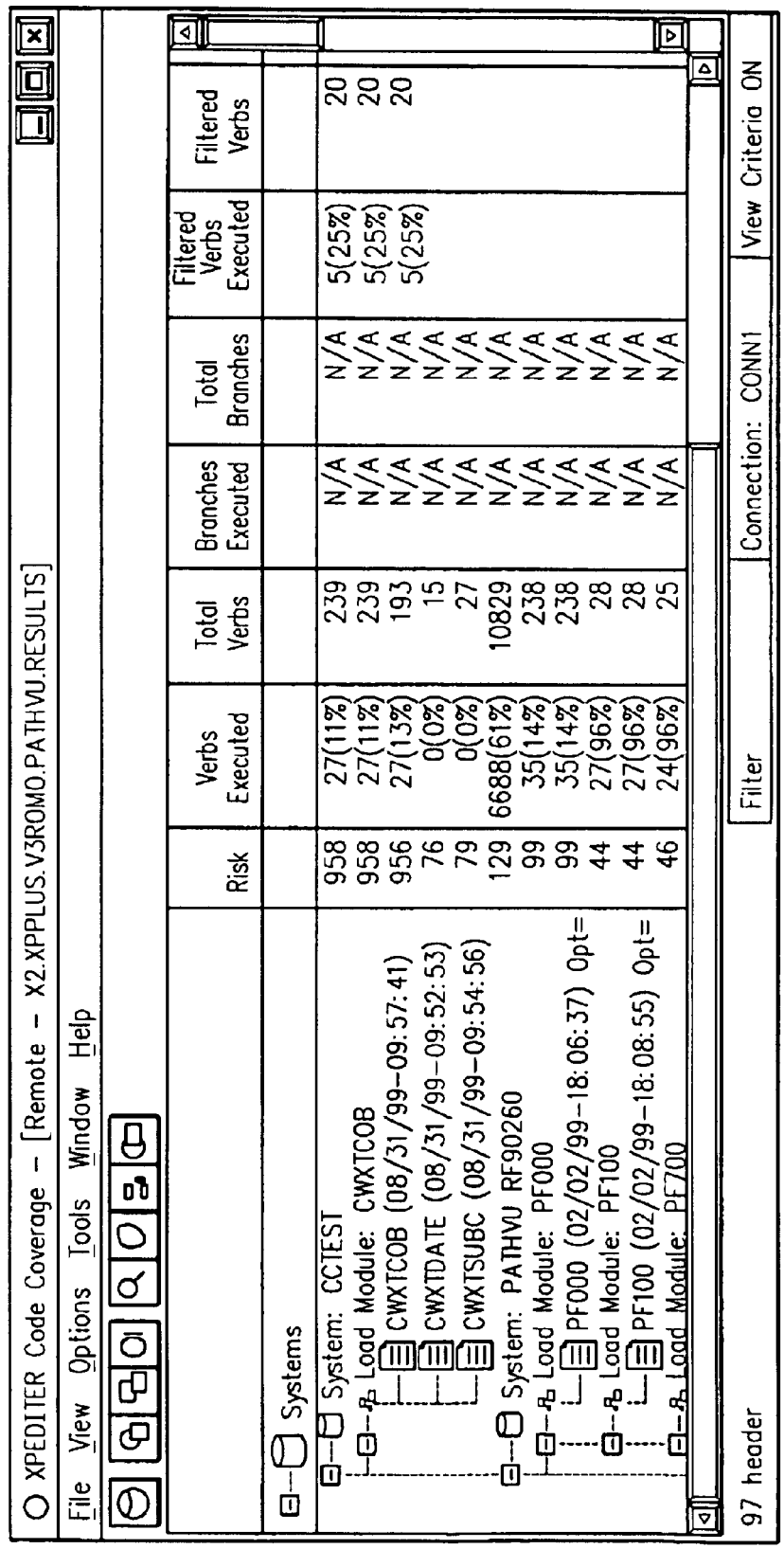
FIG. 16 is a user interface displaying risk metrics at a system level.

FIG. 16 illustrates a user interface 1600 for displaying risk metrics for different systems, and programs within a system. A system is preferably a user-defined grouping of programs. In FIG. 16, CCTEST is a system, and the programs comprising the system are also listed. In this embodiment, the risk metrics generation subsystem is independent from analyzer 113/123, and is used to generate risk metrics 1090 at a system level to allow comparison of the risk metrics of different systems and different programs. The factors are preferably computed differently than for the program module risk metric generation. For example, in one embodiment, program complexity is calculated as a count of conditional statements in a program. The risk metrics 1090 are generated for a plurality of programs under test and the tester can easily view the results in the interface 1600 to determine which systems and which program on which to focus testing efforts. For example, a tester can look at interface 1600 and quickly determine to focus testing efforts on the CCTEST system, which has a risk metric of 958, over PATHVU, which has a much lower risk metric of 129. However, as shown in FIG. 16, the individual risk metrics 1090 of different programs are also displayed in interface 1600. Thus, a tester can view the interface 1600 and quickly determine that testing efforts should be focused on the program CWXTCOB within CCTEST, as the CWXTCOB program has a much higher risk metric value than the risk metrics of the other programs comprising the CCTEST system. Thus, the present invention allows a tester to view a system and quickly determine which programs in the system and modules within the programs have the greatest risk of failure.

From the above description, it will be apparent that the invention disclosed herein provides a novel and advantageous system and method to measure and report on the effectiveness of software program testing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer-implemented system for determining the risk of not testing a computer program based on a plurality of factors for evaluating risk, the system comprising:
   a combination tool subsystem configured to accept as an input the plurality of factors, generate values for the plurality of factors based upon testing data regarding the computer program, and combine the values for the plurality of factors into a factor data set; and
   a risk evaluation tool subsystem configured to evaluate the risk of the computer program based on the factor data set and output a risk metric,
wherein the risk metric is a value and wherein the value falls within one of a first range and a second range, the first range indicating presence of a first factor for evaluating risk, and the second range indicating presence of a second factor for evaluating risk, wherein the range that the risk metric falls within further indicates a highest priority factor of said plurality of factors.

2. The computer-implemented system of claim 1 wherein the values in the factor data set are processed sequentially by the risk evaluation tool subsystem to generate the risk metric.

3. The computer-implemented system of claim 1 further comprising a factor prioritization tool subsystem configured to prioritize the plurality of factors responsive to their importance for testing.

4. The computer-implemented system of claim 1 further comprising a display tool subsystem configured to indicate within the computer program the most important factor to be tested.

5. The computer-implemented system of claim 1 further comprising a factor determination tool subsystem configured to determine the plurality of factors.

6. The computer-implemented system of claim 5 wherein the plurality of factors is input by a user.

7. The computer-implemented system of claim 5 wherein the plurality of factors is selected from a set of predetermined factors.

8. A method for increasing the efficiency of testing by determining comparative risk within a program under test, the method comprising:
   determining a plurality of factors for evaluating the comparative risk within the program under test;
   generating values for the plurality of factors based upon testing data regarding the program under test;
   determining comparative risk based on a combination of the values of the plurality of factors; and
   indicating the comparative risk including:
      indicating a portion of the program under test having a highest risk of failure, and indicating which of the plurality of factors contributed to the comparative risk, wherein the comparative risk is a value and wherein the value falls within one of a first range and a second range, the first range indicating presence of a first factor for evaluating comparative risk, and the second range indicating presence of a second factor for evaluating comparative risk, and wherein indicating which of the plurality of factors contributed to the comparative risk comprises determining a range containing the comparative risk, wherein said range containing the comparative risk further indicates a highest priority factor of said plurality of factors.

9. The method of claim 8 wherein indicating the comparative risk further includes using a risk metric to indicate relative risks of failure.

10. The method of claim 9 further comprising determining a value of the risk metric indicative of which of the plurality of factors contributed to the contributed risk.

11. The method of claim 8 wherein determining comparative risk is performed on a software program.

12. The method of claim 11 further comprising displaying a portion of the program under test in a highlighted manner to indicate the portion of the program that has a highest risk of failure.

13. The method of claim 8 wherein determining comparative risk is performed on a program module.

14. The method of claim 8 further comprising prioritizing the plurality of factors for evaluating risk.

15. The method of claim 14 wherein indicating the comparative risk further includes indicating a most important factor for risk evaluation that should be tested.

16. A method for evaluating a risk of not thoroughly testing a portion of software based on a plurality of factors relevant to a risk of failure of the portion of software, the method comprising:
   calculating values for the plurality of factors based upon testing data regarding the portion of software;
   evaluating risk based on a combination of the values of the plurality of factors; and
   providing as output a risk metric indicating the relative risk of failure of the portion of software, the risk metric corresponding to a series of ranges based upon presence of the plurality of factors in the testing data for the software program,
wherein the risk metric is a value and wherein the value falls within one of a first range and a second range, the first range indicating presence of a first factor for evaluating risk, and the second range indicating presence of a second factor for evaluating risk, wherein the range that the risk metric falls within further indicates a highest priority factor of said plurality of factors.

17. The method of claim 16 further comprising determining the plurality of factors by using a predetermined set of factors.

18. The method of claim 16 further comprising determining the plurality of factors by using a set of factors input by a user.

19. The method of claim 16 further comprising prioritizing the plurality of factors.

20. The method of claim 19 wherein prioritizing the plurality of factors is accomplished using user input.

21. The method of claim 19 wherein a value of the risk metric has a plurality of possible ranges where each range has a corresponding factor indicating the most important factor to test.

22. A computer readable medium storing a set of instructions for determining comparative risk based on a plurality of factors, the set of instructions being executable by a computer to perform steps comprising:
   combining values for the plurality of factors, wherein the values are based upon testing data regarding a process;
   determining comparative risk based on the combination of values; and
   indicating the comparative risk including:
      indicating a riskiest portion of the process; and
      indicating which of the plurality of factors contributes to the comparative risk, wherein the comparative risk is a value and wherein the value falls within one of a first range and a second range, the first range indicating presence of a first factor for evaluating comparative risk, and the second range indicating presence of a second factor for evaluating comparative risk, and wherein indicating which of the plurality of factors contributed to the comparative risk comprises determining a range containing the comparative risk, wherein said range containing the comparative risk further indicates a highest priority factor of said plurality of factors.

23. The computer readable medium of claim 22 further comprising the step of determining the plurality of factors.

24. The computer readable medium of claim 23 further comprising the step of prioritizing the factors.

25. The computer readable medium of claim 23 wherein the determining the plurality of factors for evaluating risk step is accomplished by user input.

26. The computer readable medium of claim 23 wherein the determining the plurality of factors for evaluating risk is accomplished by using a set of predetermined factors.

27. The computer readable medium of claim 22 wherein the step of indicating the comparative risk further includes using a risk metric.

28. The computer readable medium of claim 27 further comprising determining a value for the risk metric indicative of which of the plurality of factors contributed to the comparative risk.

29. The computer readable medium of claim 28 further comprising displaying a portion of a compared program in a highlighted manner to indicate the portion of the program that has a highest risk of failure.

* * * * *

UNITED STATES PATENT AND TRADEMARK OFFICE
CERTIFICATE OF CORRECTION

PATENT NO. : 6,895,577 B1
DATED : May 17, 2005
INVENTOR(S) : William Noble et al.

It is certified that error appears in the above-identified patent and that said Letters Patent is hereby corrected as shown below:

<u>Column 20,</u>
Line 6, please replace "contributed risk" with -- comparative risk --.

Signed and Sealed this

Twenty-sixth Day of July, 2005

JON W. DUDAS
*Director of the United States Patent and Trademark Office*